(12) United States Patent
Warnberg et al.

(10) Patent No.: US 9,813,638 B2
(45) Date of Patent: Nov. 7, 2017

(54) LIGHTPAINTING LIVE VIEW

(71) Applicants: Ryan Harrison Warnberg, Brooklyn, NY (US); Michelle Kirstin McSwain, Brooklyn, NY (US)

(72) Inventors: Ryan Harrison Warnberg, Brooklyn, NY (US); Michelle Kirstin McSwain, Brooklyn, NY (US)

(73) Assignee: HI PABLO, INC., Brooklyn, NY (US)

( * ) Notice: Subject to any disclaimer, the term of this patent is extended or adjusted under 35 U.S.C. 154(b) by 0 days.

(21) Appl. No.: 13/964,155

(22) Filed: Aug. 12, 2013

(65) Prior Publication Data

US 2015/0042832 A1 Feb. 12, 2015

Related U.S. Application Data

(60) Provisional application No. 61/693,795, filed on Aug. 28, 2012.

(51) Int. Cl.
*H04N 5/225* (2006.01)
*H04N 5/262* (2006.01)
*H04N 5/232* (2006.01)
*G06T 11/00* (2006.01)

(52) U.S. Cl.
CPC ......... *H04N 5/2621* (2013.01); *G06T 11/001* (2013.01); *H04N 5/23293* (2013.01)

(58) Field of Classification Search
USPC .............................. 353/34; 348/14.01, 218.1
See application file for complete search history.

(56) References Cited

U.S. PATENT DOCUMENTS

| | | | |
|---|---|---|---|
| 2005/0134722 A1* | 6/2005 | Hofer | H04N 5/2351 348/364 |
| 2007/0291233 A1* | 12/2007 | Culbertson et al. | 353/34 |
| 2008/0198168 A1* | 8/2008 | Jiao et al. | 345/506 |
| 2010/0026846 A1* | 2/2010 | Anderson | 348/231.2 |
| 2011/0032324 A1* | 2/2011 | George et al. | 348/14.12 |
| 2012/0038739 A1* | 2/2012 | Welch et al. | 348/14.01 |

FOREIGN PATENT DOCUMENTS

JP 2009239600 * 10/2009

* cited by examiner

*Primary Examiner* — Stephen Coleman
(74) *Attorney, Agent, or Firm* — Lucas & Mercanti, LLP

(57) ABSTRACT

Methods and apparatus, including computer program products, for a light painting live view. A method includes, in a device comprising at least a processor, a memory, a display and a camera device having an on-screen viewfinder, accessing the camera, capturing individual frames of footage, each of the captured frames being displayed through the on-screen viewfinder in cumulative succession, rendering the captured frames on a graphical processing unit (GPU), sending the captured frames through a shader program, generating at least two images, a first image saved to the memory and a second image displayed on the display, and rendering the first image into the second image to generate a final image.

13 Claims, 2 Drawing Sheets

```
                    100
              Access the camera
                    105
                     ▼
        Render the captured frames on a GPU
                    110
                     ▼
       Send captured frames through a shader program
                    115
                     ▼
              Save one image to memory
                    120
                     ▼
             Display one image on display
                    125
                     ▼
           Render one image into the other image
                    130
                     ▼
   Convert the image that is rendered into the memory to a JPEG file
                    135
```

LIGHTPAINTING LIVE VIEW

CROSS REFERENCE TO RELATED APPLICATIONS

This application claims the benefit of U.S. Provisional Application No. 61/693,795, filed Aug. 28, 2012. The disclosure of the prior application is considered part of and is incorporated by reference in the disclosure of this application.

BACKGROUND OF THE INVENTION

The present invention generally relates to devices having a camera feature, and more particularly to a light painting live view.

Like cameras, smartphones, such as the Apple iPhone®, Samsung Galaxy®, Blackberry Q10® and the like, and tablet computers running, for example, Google's Android® operating system (O/S) and Apple's iOS® O/S, include among their features, built-in cameras for taking photos. Applications executing in the smartphones and tablet computers enable control of the built-in cameras, including light painting.

In general, light painting is a photographic technique, often performed at night or in a dark area, where a photographer can introduce different lighting elements during a single long exposure photograph. light painting enables the capture of light trails, light graffiti tags, and so forth.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for a light painting live view.

In general, in one aspect, the invention features a method including, in a device including at least a processor, a memory, a display and a camera device having an on-screen viewfinder, accessing the camera, capturing individual frames of footage, each of the captured frames being displayed through the on-screen viewfinder in cumulative succession, rendering the captured frames on a graphical processing unit (GPU), sending the captured frames through a shader program, generating at least two images, a first image saved to the memory and a second image displayed on the display, and rendering the first image into the second image to generate a final image In another aspect, the invention features a method including, in a device including at least a processor, a memory, a display and a camera device, executing a light painting live view process in conjunction with the camera to provide a long exposure camera that displays a creation of an exposure in real time.

In still another aspect, the invention features an apparatus including a processor, a memory, a display, and a camera device, the memory including a light painting live view process, the light painting live view process including accessing the camera, capturing individual frames of footage, each of the captured frames being displayed through the on-screen viewfinder in cumulative succession, rendering the captured frames on a graphical processing unit (GPU), sending the captured frames through a shader program, generating at least two images, a first image saved to the memory and a second image displayed on the display, and rendering the first image into the second image to generate a final image.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein.

DETAILED DESCRIPTION

Figure 1:
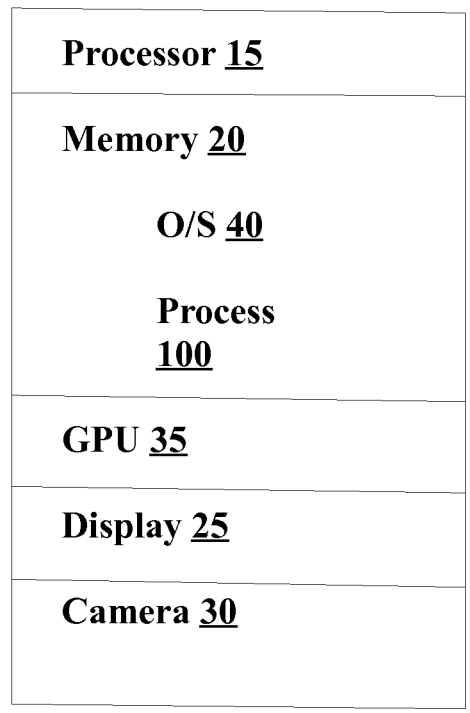
FIG. 1 is a block diagram of an exemplary smartphone.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As shown in FIG. 1, an exemplary device 10 includes at least a processor 15, a memory 20, a display unit 25, a camera 30 and a graphical processing unit (GPU) 35. Example devices 10 include DSLR cameras, smartphones, tablet computers, personal data assistants, digital televisions, computers, laptops, devices with an integrated digital camera such as Nintendo® DS, wearable devices, devices with a digital camera, and so forth. The GPU 35 is an electronic circuit designed to rapidly manipulate and alter memory 20 to accelerate a creation of images in a frame buffer intended for output to the display unit 25.

The memory 20 can include at least an operating system (O/S) 40, such as Windows®, Linux®, Google's Android®, Apple's iOS®, or a proprietary OS, and a light painting live view process 100.

Light painting is a photographic technique in which exposures are made by moving a hand-held light source or by moving the camera. The term light painting also encompasses images lit from outside the frame with hand-held light sources. By moving the light source, the light can be used to selectively illuminate parts of the subject or to "paint" a picture by shining it directly into the camera lens. Light painting requires a slow shutter speed, usually a second or more. Light painting can take on the characteristics of a quick pencil sketch.

Light painting by moving the camera, also called camera painting, is the antithesis of traditional photography. At night, or in a dark room, the camera can be taken off the tripod and used like a paintbrush. An example is using the night sky as the canvas, the camera as the brush and cityscapes (amongst other light sources) as the palette. Putting energy into moving the camera by stroking lights, making patterns and laying down backgrounds can create abstract artistic images.

Light painting can be done interactively using a webcam. The painted image can already be seen while drawing by using a monitor or projector.

Another technique used in the creation of light art is the projection of images on to irregular surfaces (faces, bodies, buildings, and so forth), in effect "painting" them with light. A photograph or other fixed portrayal of the resulting image is then made.

The light painting live view process 100 executes in conjunction with the camera 30 to provide a long exposure camera that displays the creation of the exposure in real time.

The device 10 can support a variety of applications, such as a telephone application, a video conferencing application, an e-mail application, an instant messaging application, a blogging application, a web browsing application, a digital music player application, and/or a digital video player application.

The light painting live view process 100 is a light painting application. In light painting, a user can use a light source to draw shapes and patterns in front of a camera set to a long exposure. The light painting live view process 100 enables the user behind the camera 30 within the device 10 (or tablet computer) to watch the shapes or patterns that are being created, as they are being created. In prior approaches, the user must wait until the end of the exposure to see what has been made or created.

Figure 2:
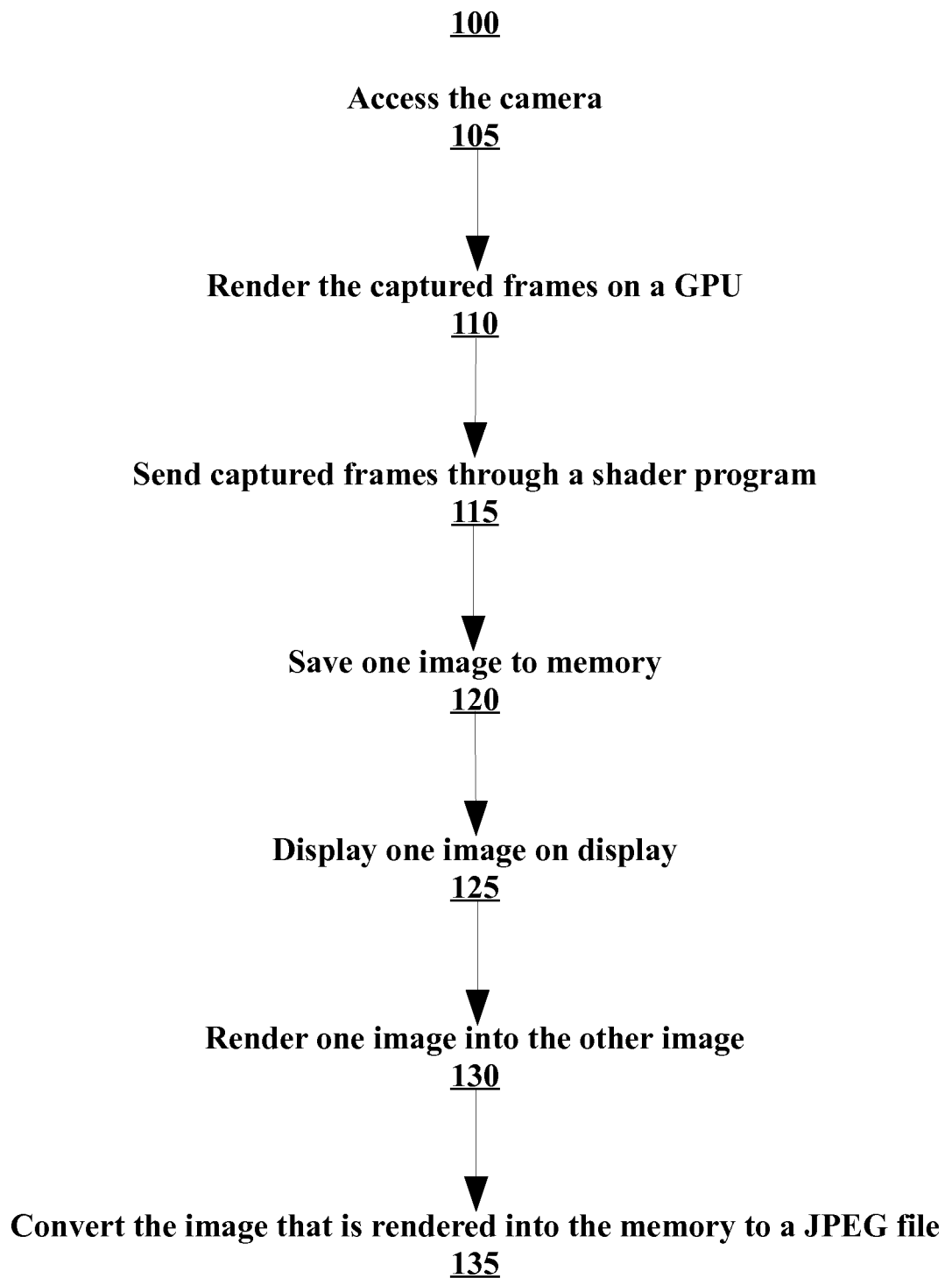
FIG. 2 is a flow diagram of an exemplary light painting live view process.

As shown om FIG. 2, the light painting live view process 100 accesses (105) the camera, which captures individual frames of footage, each of the captured frames displayed on a viewfinder in cumulative succession.

While frames are being captured by the camera, the light painting live view process 100 renders (110) the captured frames on a graphical processing unit (GPU), which is a user-facing camera "viewfinder" feature of the light painting live view process 100.

For every frame that is being captured to create an image, the light painting live view process 100 also sends (115) them through a shader program (also referred to as a vertex and fragment program) into graphical processing unit (GPU). In general, a shader is a computer program that is used to do shading, produce special effects and/or do post-processing. Shaders calculate rendering effects on graphics hardware with a high degree of flexibility. Most shaders are coded for a graphics processing unit (GPU), though this is not a strict requirement. The position, hue, saturation, brightness, and contrast of all pixels, vertices, or textures used to construct a final image can be altered on the fly, using algorithms defined in the shader, and can be modified by external variables or textures introduced by the program calling the shader.

Sending (115) the captured frames through the shader creates two images, one image saved (120) to the device's memory and the other image displayed (125) by light painting live view process 100 for the user to see as if they were watching a video. The light painting live view process 100 uses frames from the camera as the input of the shader program and a progress frame as the output of the shader program. Through additive blending, one image is rendered (130) into the other by the light painting live view process 100, i.e., the image that is being drawn progressively is rendered to the display.

Once the user signals the light painting live view process to stop, the light painting live view process 100 converts (135) the image that is rendered into the memory to a Joint Photographic Experts Group (JPEG) file and projects (140) the JPEG file as a final image on the display.

As described above, a user initiates the light painting live view process 100, which generates a home screen graphical user interface (GUI). The GUI includes a main navigation bar that includes a pictorial rendering of a small camera. When the small camera is tapped, the light painting live view process 100 opens up to the camera built into the device's memory. The camera screen appears as though it's a video screen, ready for capture. The navigation bar shows a button to tap to begin image capture.

A video capture session is initiated and anything that passes in front of the camera will leave a trail, similar to a long exposure on a single-lens reflex/digital single-lens reflex (SLR/DSLR) camera. The difference is that the user sees the trail as it is created, in real time, like a mixture of a stop motion video and an Etch-A-Sketch®.

This is viewed facing through the viewfinder on of the light painting live view process 100, which is a screen that accesses the forward facing camera on the device. Anything viewed by that camera is seen through the light painting live view process 100 viewfinder.

Exposures can be set for one second, or they can run as long as the user has memory in their device to store the image/video data. The exposure can also be stopped by tapping the same button used to start the exposure.

The user can move their camera around to capture trails, or they can make their own trails with a light of their own.

For every frame that is being captured to create the image, the captured frame is sent through a shader program into the GPU.

A GL_MAX blend operation, which specifies how source and destination colors are combined, is responsible for producing the light painting, but to control the output a fragment shader program is used. The fragment shader is run on each pixel of an image, producing for each input pixel a corresponding output pixel. The fragment shader supports an "Ambient Light Amount" feature of the capture settings. By taking a brightness parameter between 0 and 1, the fragment shader enables throttling the affect of light input on the painting.

The following is one example of fragment shader source code:

```
precision mediump float;
varying vec2 v_uv;
niform sampler2D u_diffuseTexture;
uniform float u_brightness;
void main(void)
{
//sample color
vec4 color=texture2D(u_diffuseTexture, v_uv);
//calculate luminance intensity
float    lumIntensity=color.x*0.299+color.y*0.587+color.z*0.114;
//clamp and exaggerate luminance intensity
lumIntensity=min(1.0, lumIntensity);
lumIntensity=lumIntensity*lumIntensity;
lumIntensity=max(u_brightness, lumIntensity);
//output final color
gl_FragColor=color*lumIntensity;
}
```

The light painting live view process 100 then generates images in stages:

Image Stages/Names Stage

1. Raw Image—this is the image data coming from the device's video camera, frame-by-frame, stored in a buffer managed by the operating system.

2. Input Image—this is the image used as an input to the fragment shader program, stored in an OpenGL texture. A texture is an OpenGL Object that contains one or more images that all have the same image format. A texture can be used in two ways. It can be the source of a texture access from a shader, or it can be used as a render target. The raw image is copied into the input image.

3. Intermediate Output Image—this is the output of the fragment shader program, stored in an OpenGL texture. The input image is rendered into the intermediate output image, using a custom OpenGL frame buffer backed by an OpenGL texture. In general, frame buffer objects are a mechanism for rendering to images other than the default OpenGL Default frame buffer. They are OpenGL Objects that allow you to render directly to textures, as well as blitting from one frame buffer. to another.

4. Preview Image—this is the output of the fragment shader program, shown on the device's display. The input image is rendered to the screen, using the default OpenGL frame buffer backed by the device's display.

5. Output Image—this is the output of copying and compressing the data from the intermediate output image to a JPEG representation. The output image may be saved to the device's display's camera roll, shared via email, Facebook® or Twitter®, or uploaded to a server.

Through additive blending, one image is rendered into the other in the order laid out above. The image that is being drawn progressively is rendered to the display.

Blending Modes Stage

To produce a light painting, the pixels of the intermediate output image are blended with the pixels of the input image. The output of that blending process is then used to replace the previous value of each pixel of the intermediate output image.

The OpenGL blend mode "GL_MAX" is used to blend the pixels. The maximum of the two pixel values is the output of the operation.

The following describes the effect of the GL_MAX blend mode on pixel values (taken from the OpenGL documentation at http://www.opengl.org/sdk/docs/man/xhtml/glBlendEquation.xml):

Mode
RGB Components
Alpha Component
GL_MAX
Rr=max ⟨R s R d⟩
Gr=max ⟨G s G d⟩
Br=max ⟨B s B d⟩
Ar=max ⟨A s A d⟩

When all done, the output image is displayed:

5. Output Image—this is the output of copying and compressing the data from the intermediate output image to a JPEG representation. The output image may be saved to the device's display's camera roll, shared via email, Facebook® or Twitter®, or uploaded to the server.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. Accordingly, other implementations are within the scope of the following claims.

What is claimed is:

1. A method comprising:
in a device comprising at least a processor, a memory, an integrated display and an integrated camera device having an on-screen viewfinder, accessing the integrated camera;
continuously capturing individual frames of footage and then displaying a progress of the individual frames that create a final image as they are captured, in real time, with each frame displaying as it is captured in cumulative succession on the on-screen viewfinder as the capture is being made, such that any light or object which passes in front of the camera will leave a trail on the on-screen viewfinder that illustrates a path that the light or object traveled during an exposure period until a user stops capturing or the device ceases to function;

rendering the captured frames on a graphical processing unit (GPU); sending the captured frames through a shader program;

generating at least two images, a first image saved to the memory and a second image displayed on the on-screen viewfinder; and rendering the first image into the second image to generate a final image.

2. The method of claim 1 wherein the shader program receives input from the camera and outputs a progress frame.

3. The method of claim 2 wherein generating the at least two images comprises: an image/name stage; and
blending modes stage.

4. The method of claim 3 wherein the image/name stage comprises: storing image data coming from the camera in a buffer in the memory; using the stored image as an input to the shader program; and
outputting an intermediate image from the shader program to the display, the intermediate image blended with the input images.

5. The method of claim 4 wherein the blending modes stage comprises:
blending pixels of the intermediate output image with pixels of the input image; and
replacing previous values of pixels with pixels of the intermediate output image.

6. The method of claim 5 wherein the input is a OpenGL texture.

7. The method of claim 6 further comprising: compressing the final image; and
converting the compressed final image to a Joint Photographic Experts Group (JPEG) file.

8. The method of claim 7 further comprising projecting the JPEG file on the display.

9. The method of claim 8 wherein the device is selected from the group consisting of a DSLR camera, a smartphone, a tablet computer, a personal data assistants, a digital televisions, a computers, a laptops, a device with an integrated digital camera, a wearable device, and a device with a digital camera, a digital camera, and a personal data assistant.

10. The method of claim 9 wherein the device is a smartphone or tablet computer.

11. The method of claim 10, wherein the blending modes stage further comprises:
selecting a maximum value between each of a plurality of pixel values of each pixel of the input image and each corresponding pixel value of each corresponding pixel of the intermediate output image; and
outputting each maximum pixel value as the pixel value for each corresponding pixel of the resultant blended image.

12. The method of claim 11, wherein the shader program further comprises:
measuring an ambient light amount for the input image;
setting a brightness parameter between 0 and 1; and
throttling the effect of light input on a light painting.

13. An apparatus comprising:
a processor;
a memory;
a display; and
a camera device having an on-screen viewfinder;
the memory comprising a light painting live view process, the light painting live view process comprising the steps of the method of claim 1.

* * * * *